June 9, 1931.  N. MILNER  1,809,348

TRUCK BODY

Filed Dec. 28, 1925   9 Sheets-Sheet 1

Inventor
Nugent Milner

By Whittemore Hulbert Whittemore
Belknap   Attorneys

June 9, 1931. N. MILNER 1,809,348
TRUCK BODY
Filed Dec. 28, 1925 9 Sheets-Sheet 4

Inventor
Nugent Milner
By Whittemore Hulbert Whittemore
& Belknap
Attorneys

June 9, 1931. N. MILNER 1,809,348
TRUCK BODY
Filed Dec. 28, 1925 9 Sheets-Sheet 6

Inventor
Nugent Milner

By Whittemore Hulbert Whittemore
+Belknap Attorneys

June 9, 1931.  N. MILNER  1,809,348
TRUCK BODY
Filed Dec. 28, 1925   9 Sheets-Sheet 9

Inventor
Nugent Milner

By Whittemore Hulbert Whittemore
+Belknap   Attorneys

Patented June 9, 1931

1,809,348

UNITED STATES PATENT OFFICE

NUGENT MILNER, OF EVANSVILLE, INDIANA, ASSIGNOR TO GRAHAM BROTHERS, OF EVANSVILLE, INDIANA, A CORPORATION OF INDIANA

TRUCK BODY

Application filed December 28, 1925. Serial No. 77,993.

This invention relates generally to truck bodies and consists of certain novel features of construction, combinations and arrangements of parts as will be more fully described and particularly pointed out in the appended claims.

Referring now to the drawings, the numeral 1 designates a motor driven truck having a body 2 that is preferably divided longitudinally into a drivers compartment or cab 3 and a merchandise compartment 4. As shown, the drivers compartment 3 includes the front, back, top and rear quarter sections 5, 6, 7 and 8 respectively and is provided at its opposite sides between the front and rear quarter sections 5 and 8 respectively with suitable doors 9, while the merchandise compartment 4 includes the base and side sections 10 and 11 respectively and is provided at its rear end with a suitable hinged tailgate 12. In detail, the base section 10 is secured to the chassis of the vehicle and comprises the sills 13, cross members 14 and flooring 15; each side section 11 is secured to the base section 10 and comprises the wood frame work 16 and metal covering 17; the back section 6 is assembled with a substantially U-shaped seat support 18 and is secured to the base section 10 between the side sections 11; the front section 5 is also mounted on the base section 10 and preferably comprises the pillars 19, belt bar 20 and header 21; each door 9 is hingedly connected to a pillar 19 of the front section 5 and preferably comprises the wood frame work 22 and outer panels 23; each rear quarter section 8 is mounted on posts 24 projecting upwardly from the base unit 10 and preferably comprises the wood frame work 25, window 26, gusset plate 27 and outer panels 28; and the top section 7 is mounted on the pillars 19 and rear quarter sections 8 and comprises the wood frame work 29 and covering 30. If desired, an auxiliary back section 31 having a window opening therein may be secured to the rear quarter sections 8 above the back section 6 to close the space between the top section 7 and back section 6.

It will be noted at this point that the metal covering 17 of each side section 11 is prevented from being warped by spacing the boards 32 slightly apart to take care of expansion and contraction and is prevented from setting up any objectionable noise by the provision of a suitable cloth lining 33 between the boards 32 and metal covering 17. If desired dum dum paste may be employed in the spaces provided between the boards 32 to make the joints weatherproof. Hence each side section 11 is rigid and durable in construction and is neat in appearance. Suitable cloth lining 34 is also preferably provided between the woodwork 22 and coverings 23 of each door to prevent the metal coverings setting up objectionable noise. The gusset plates 27 of the rear quarter sections 8 project downwardly between the posts 24 and have lateral flanges 35 at their lower ends that extend over and are secured to the horizontal members 36 of the support 18. It will also be noted that these posts 24 are preferably provided with longitudinally extending grooves or channels 39 which constitute guide-ways for receiving the windows 26 when in lowered position. These windows are received in longitudinally extending groves 40 in the upright members 41 of the rear quarter sections 8 when in raised position and are preferably held against rattling by means of spring pressed bars 42 hingedly connected to the cross rails 43 at the lower ends of the window openings. As shown, each bar 42 has a transversely extending grove 44 providing a shoulder 45 for holding the window 26 in raised position and is provided with a suitable recess 46 for receiving the finger grip 47 on the window 26 when the latter is in lowered position.

Secured to the rear quarter sections 8 at each side of the body are metallic gusset plates 48 which cooperate with angle irons 49 for holding suitable flare boards 50 at the upper edges of the side sections 11. As shown, these angle irons 49 are provided opposite to the lower edges of the flare boards 50 with substantially L-shaped shoulders 51 which seat upon the upper ends of short posts 52 projecting upwardly from the flooring 15 at the rear ends of the side sections 11 and are adapted to support trays or other devices which may be used to carry articles above the flooring 15. Auxiliary braces 53, 54, and 55 respectively are also preferably provided at the rear end of the body to strengthen the construction. As shown, the braces 53 are L-shape in configuration and are secured to the side sections 11 and to lateral portions 15' of the sills 13; the braces 54 are secured to the flare boards 50 and overlap the upper portions of the braces 53; and the braces 55 also overlap the braces 53 and have threaded lower end portions 56 which extend through the horizontal portions 57 of the braces 53 and the lateral portions 15' of the sills. Suitable nuts 58 and 59 respectively are mounted on the threaded portion 56 of each brace 55 above and below the lateral portions 15' of the sills to hold the parts in position. It will also be noted that the braces 53, 54 and 55 respectively are secured to the side sections 11 by the bolts 60 and 61 respectively which are used to secure the inside angle irons 49 to the posts 52. Thus, with this construction, the upper nuts 58 may be adjusted to properly align the side sections 11 of the merchandise compartment with the sides of the drivers compartment.

Figure 1:
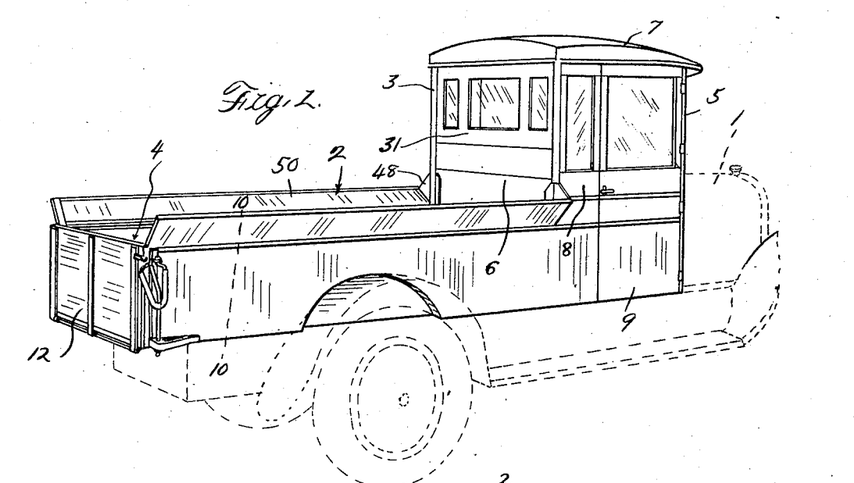
Figure 1 is a perspective view of a truck embodying my invention.
Figure 2:
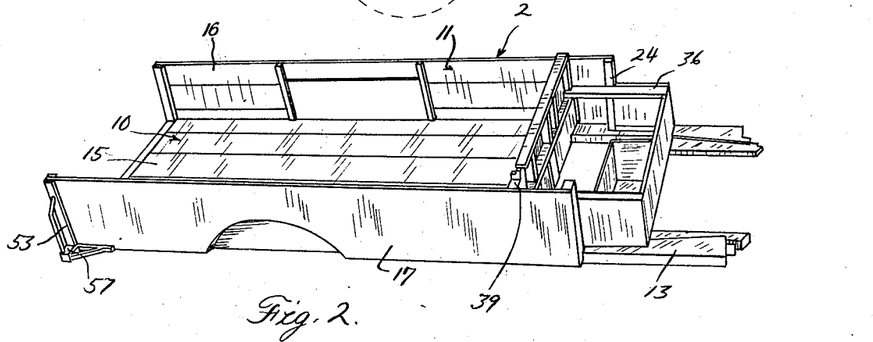
Figure 2 is a perspective view of a portion of the truck body.
Figure 3:
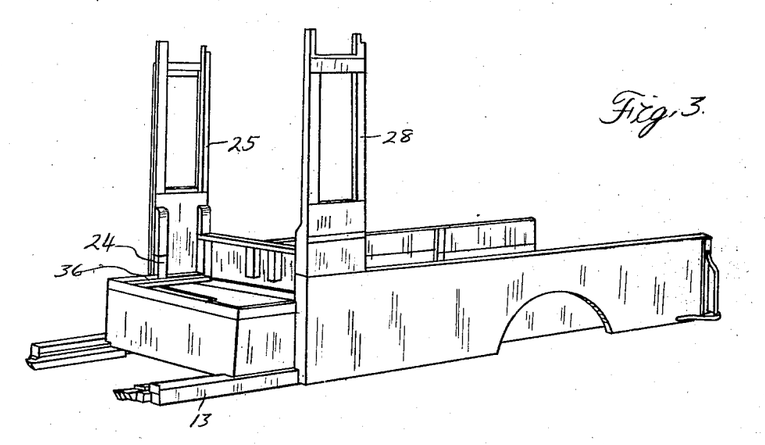
Figure 3 is a view similar to Figure 2 with the rear quarter sections mounted thereon.
Figure 4:
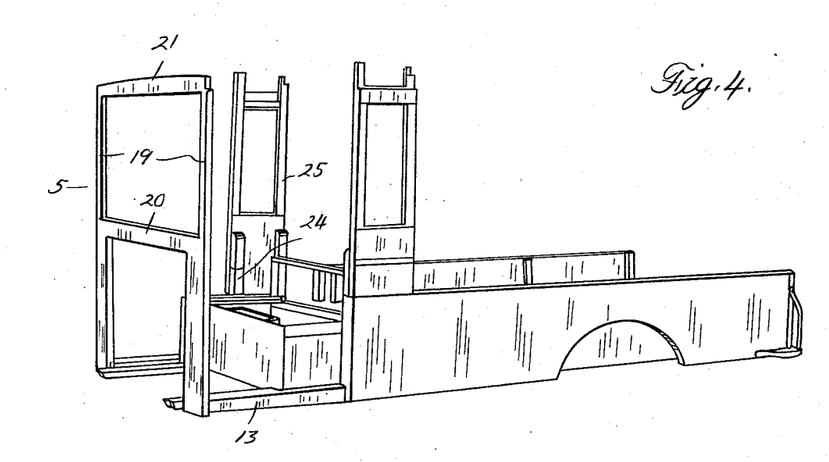
Figure 4 is a view similar to Figure 3 with the front section mounted thereon.
Figure 5:
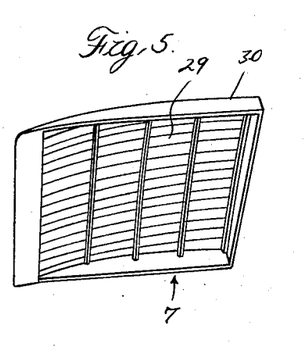
Figure 5 is a detail perspective view of the top section.
Figure 6:
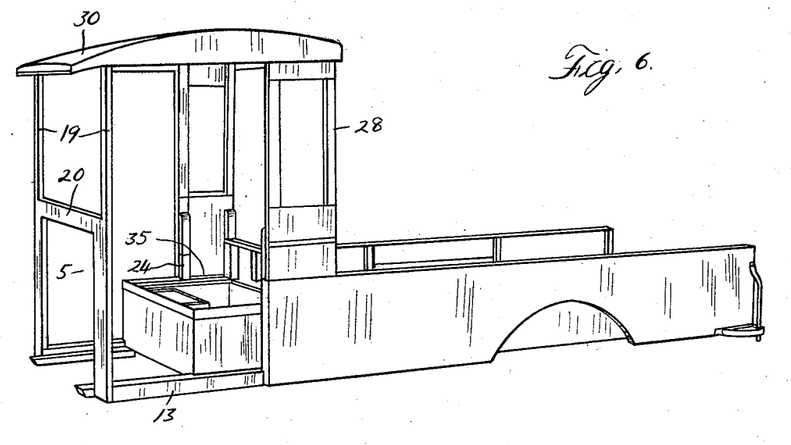
Figure 6 is a view similar to Figure 4 with the top section in position.
Figures 7, 10:
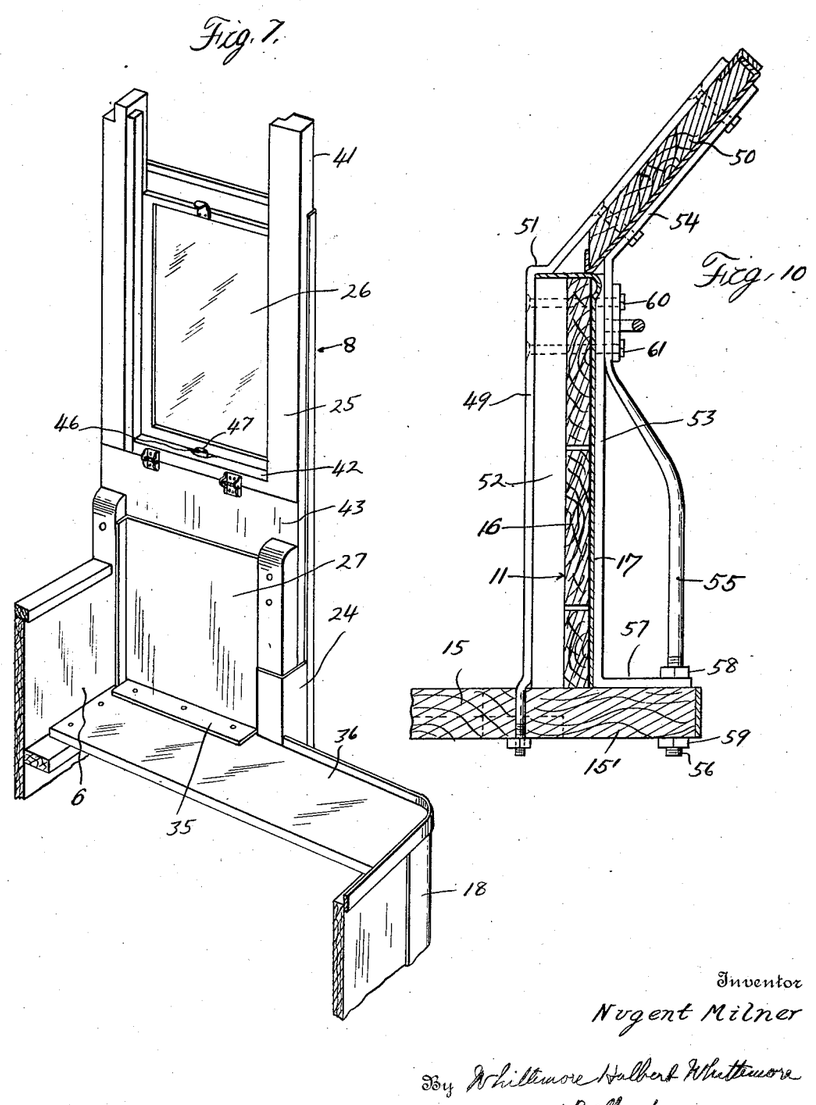
Figure 7 is a fragmentary perspective view of the truck body.
Figure 10 is a fragmentary vertical sectional view taken on the line 10—10 of Figure 1.
Figures 8, 9, 20:
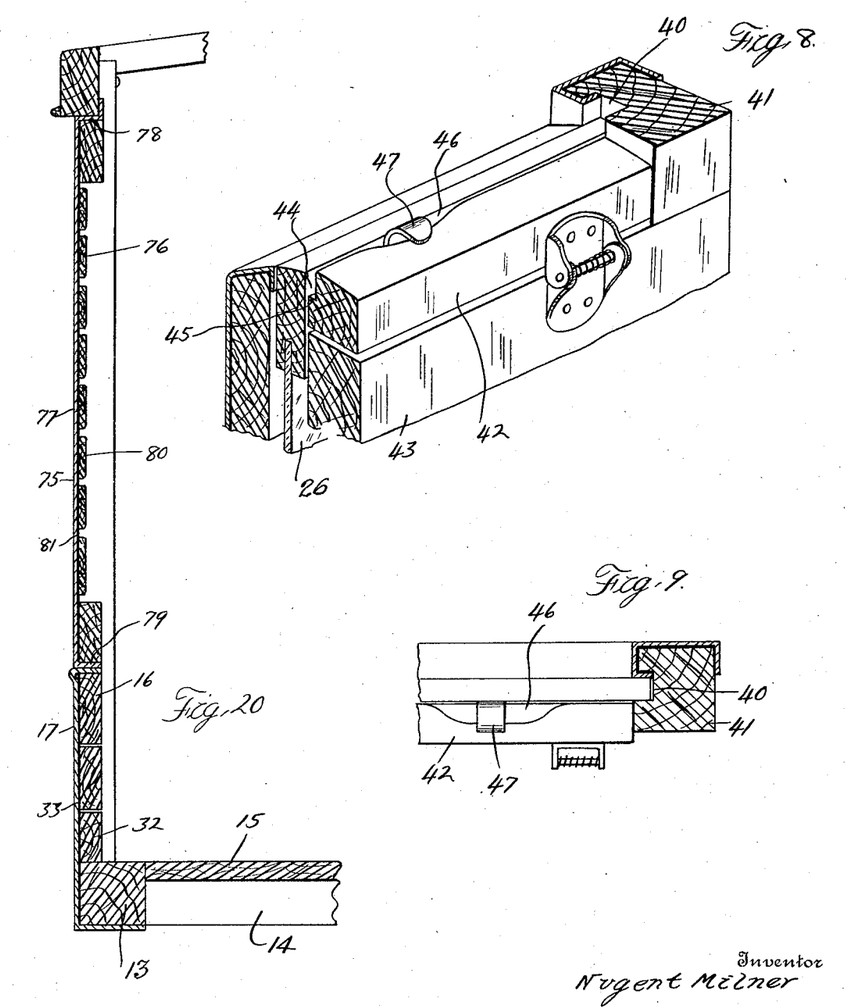
Figure 8 is another fragmentary perspective view.
Figure 9 is a top plan view of Figure 8.
Figure 20 is a fragmentary vertical sectional view taken on the line 20—20 of Figure 17.
Figure 11:
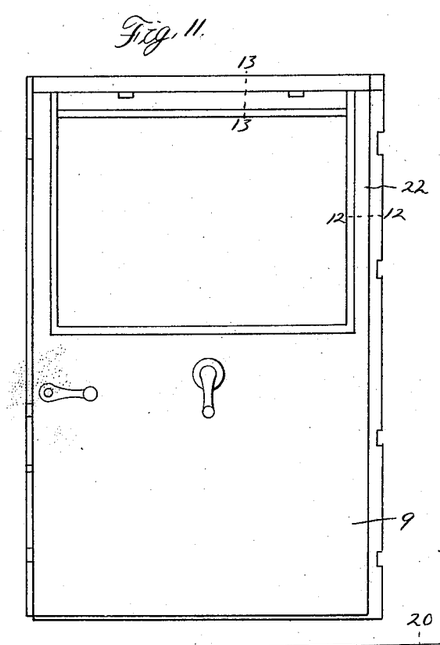
Figure 11 is a detail view of one of the doors.
Figure 12:
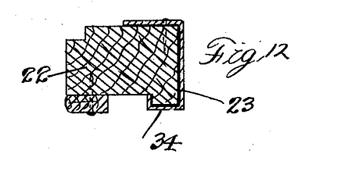
Figure 12 is a sectional view taken on the line 12—12 of Figure 11.
Figure 13:
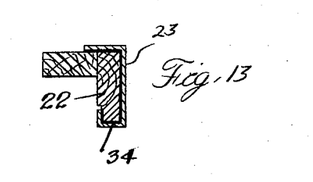
Figure 13 is a sectional view taken on the line 13—13 of Figure 11.
Figure 14:
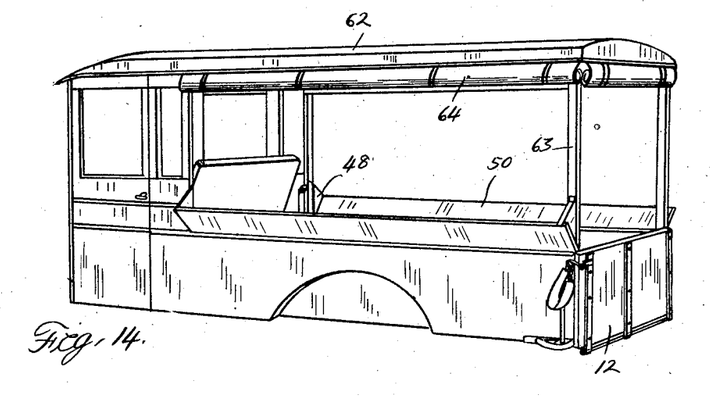
Figure 14 is a perspective view of a slightly modified form of construction.
Figures 15, 16:
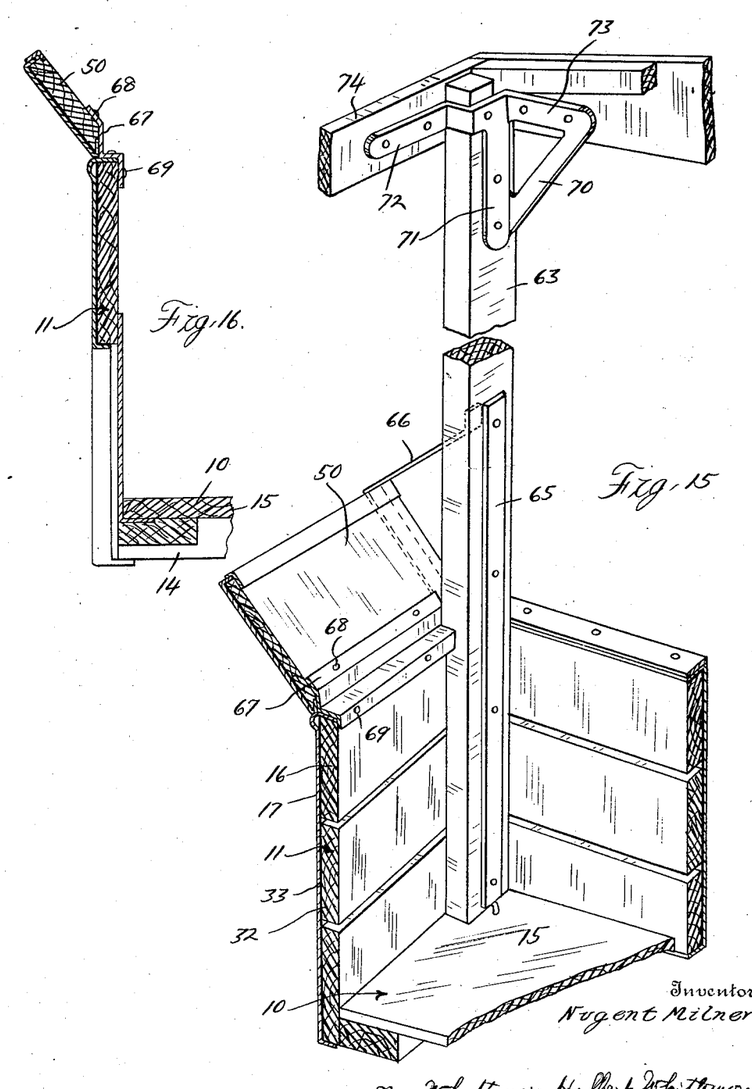
Figure 15 is a fragmentary perspective view of the construction shown in Figure 14.
Figure 16 is a fragmentary vertical sectional view of a portion of Figure 15.
Figure 17:
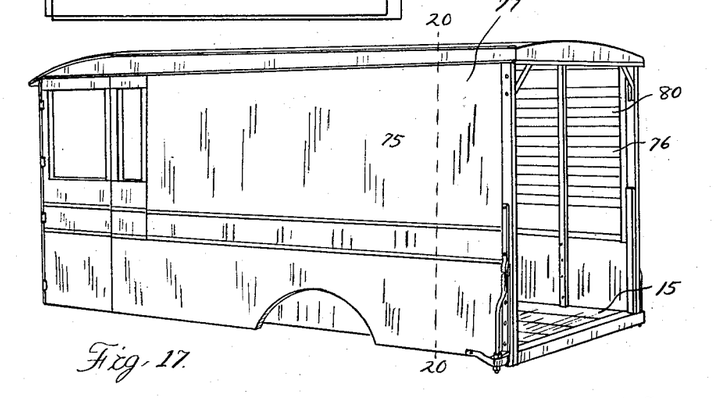
Figure 17 is a perspective view of another modified construction.
Figure 18:
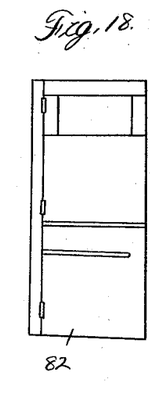
Figure 18 is a rear elevation of one of the doors for the construction shown in Figure 17.
Figure 19:
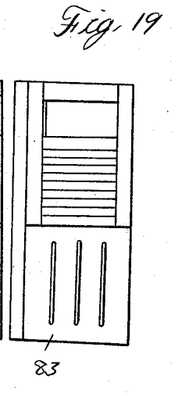
Figure 19 is a front elevation of the door shown in Figure 18.
Figure 21:
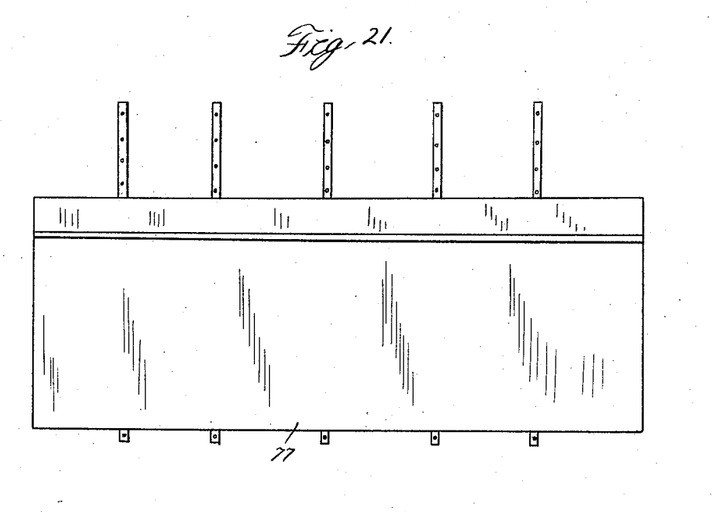
Figure 21 is a detail side elevation of one of the panels shown in Figure 17.
Figure 22:
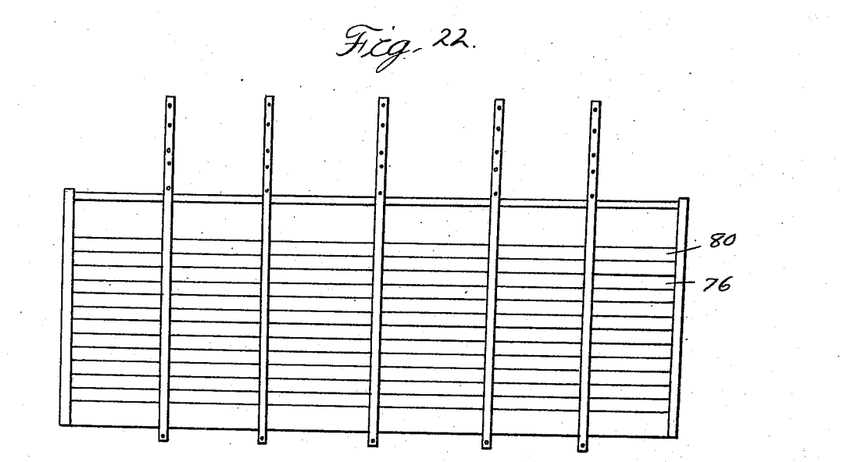
Figure 22 is an inside elevation of the panel shown in Figure 21.

In Figures 14 to 16 inclusive I have shown a slight modification in which the top section 62 of the drivers compartment is extended rearwardly over the merchandise compartment and is supported at its rear end upon suitable posts 63 that are substituted for the short posts 52. With this construction the auxiliary back section 31 is preferably removed and flexible curtains 64 are preferably secured to the sides and back of the top section 62. Straight braces 65 are substituted for the angle irons 49 and are secured to the inner sides of the posts 63, while angle braces 66 are employed on the outer sides of the posts 63 for holding the flare boards 50. Angle-shaped strips 67 close the spaces between the flare boards 50 and the side sections 11 and are rigidly secured thereto by suitable headed elements 68 and 69 respectively. The construction is strengthened and reinforced further by the provision of angle braces 70 at the upper ends of the posts 63. As shown, each brace 70 has a vertical portion 71 secured to the inner side of a post 63 and has horizontally disposed laterally extending portions 72 and 73 respectively secured to the frame work 74 of the top.

In Figures 17 to 22 inclusive I have shown still another modification in which suitable panels 75 are used to close the space between the side sections 11 and the top 62. As shown, each panel 75 comprises a frame work 76 of wood and a metal covering 77 having inturned marginal flanges 78 and 79 respectively that are secured to the upper and lower edges of the frame work. The boards 80 are also spaced apart so that expansion and contraction thereof will not warp the outer covering 77 and suitable fabric lining 81 is positioned between the boards 80 and covering 77 to prevent the latter setting up any objectionable noise. With this construction, the flare boards 50 and supports therefor are removed entirely and doors 82 and 83 respectively are substituted for the tail-gate 12.

Figure 23:
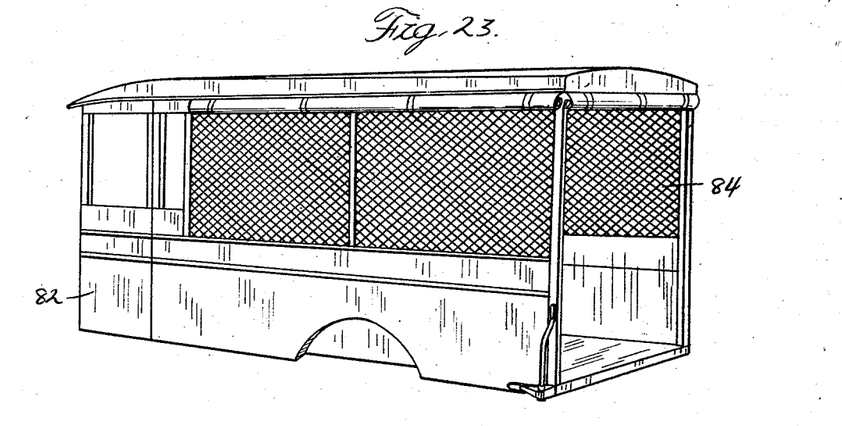
Figure 23 is a view similar to Figure 17 but showing the truck body provided with a screen panel.

In Figure 23 I have shown another modification in which suitable screens 84 have been substituted for the panel 75.

Thus, from the foregoing description, it will be readily apparent that the parts forming the truck body may be easily and quickly assembled or knocked down for shipment. Moreover, the woodwork construction is such that straight runs are provided, hence the machining operations are greatly simplified. It will also be apparent that standard parts may be employed in the assembly up to a certain point whereupon the body may be readily converted from the open or canopy type to either the closed type shown in Figure 17 or to the screen type shown in Figure 23.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. In a vehicle body, the combination with a base section, of a seat support thereon, a post projecting upwardly from the base section adjacent to said seat support, and a rear quarter section on the post having a plate provided with a laterally extending flange secured to said seat support.

2. In a vehicle body, the combination with a base section, and side sections thereon, of a seat support between said side sections, rear quarter sections secured to said seat support, and supports for said rear quarter sections between said seat support and side sections.

3. In a rear quarter section for vehicle bodies including a frame work of wood, an outer covering therefor, and attachment means for said section including a gusset plate secured to said frame work and having a laterally projecting attaching flange.

4. In a truck body, a base section, a seat support rising from said base section and provided at opposite sides thereof with inwardly extending substantially horizontal members, posts rising from the base section upon the outer sides of the seat support and projecting upwardly above the latter, rear quarter sections mounted on said posts, and connections between said rear quarter sections and seat support including gussets secured to said rear quarter sections between said posts and having lateral flange portions secured to the horizontal portions aforesaid of said seat support.

5. In a truck body, a base section, a seat support of substantially U configuration rising from the base section and provided at opposite sides of the U with inwardly extending substantially horizontal plate-like members, posts rising from the base section upon the outer sides of the U, rear quarter sections mounted on said posts, and connections between said rear quarter sections and seat support including gussets lying flat against the inner sides of the rear quarter sections and having lateral flange portions secured to said posts and plate-like members aforesaid.

6. In a truck body, a base section, a seat support rising from the base section and provided at opposite sides thereof with inwardly extending substantially horizontal plate-like members, posts rising from the base section upon opposite sides of the seat support, rear quarter sections mounted on said posts, and connections between said rear quarter sections and seat support including substantially flat gussets having portions lying flat against the inner sides of said rear quarter sections and against the opposed inner sides of said posts and having lateral flange portions secured to the plate-like members aforesaid.

In testimony whereof I affix my signature.

NUGENT MILNER.